Dec. 9, 1969   A. E. CROUCH ET AL   3,483,466
PIPELINE INSPECTION APPARATUS FOR DETECTION
OF LONGITUDINAL DEFECTS
Filed Nov. 3, 1967                                           2 Sheets-Sheet 1
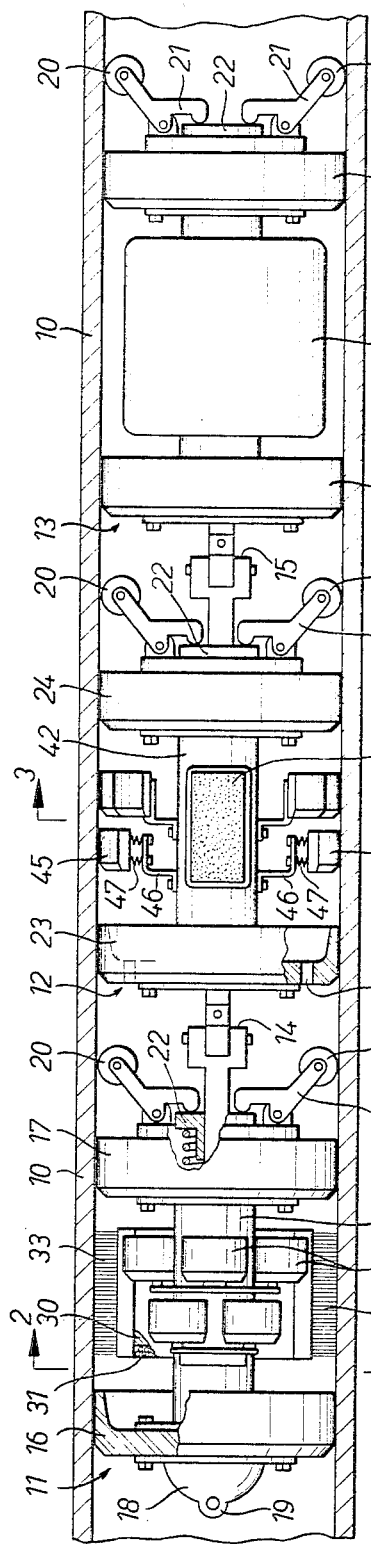
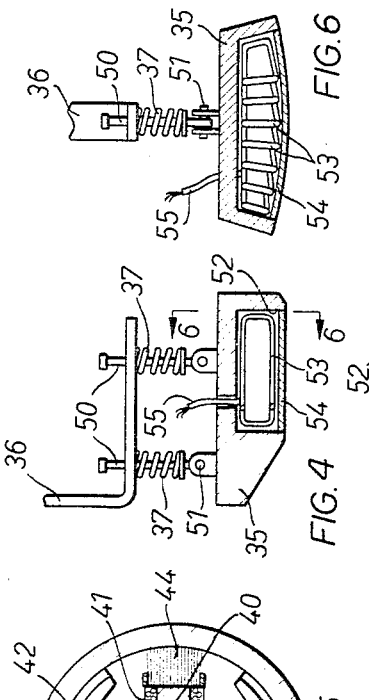
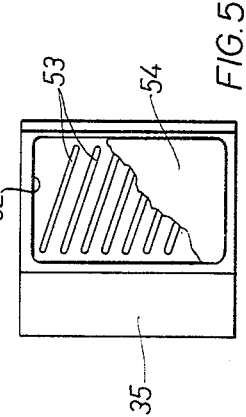
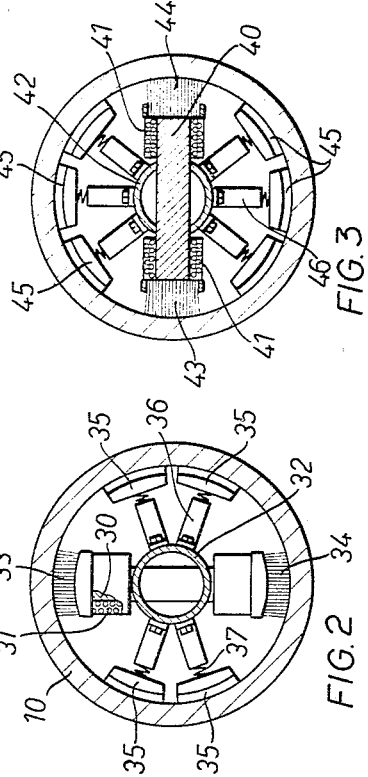
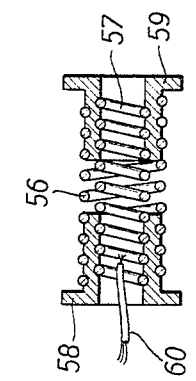
A. E. CROUCH &
R. C. BEAVER
INVENTORS
BY Arnold, Roylance,
Kruger & Durkee
ATTORNEYS

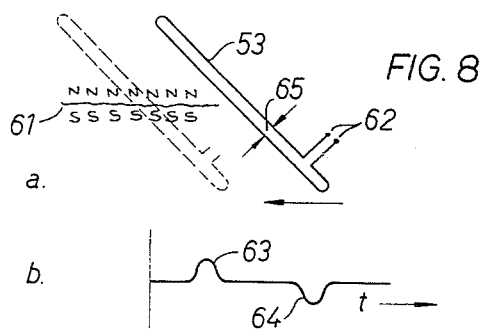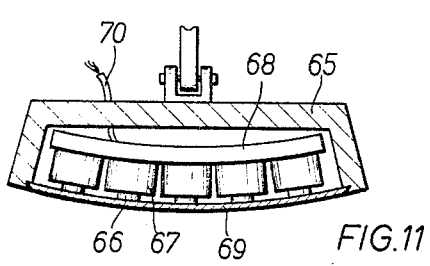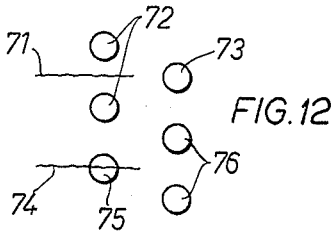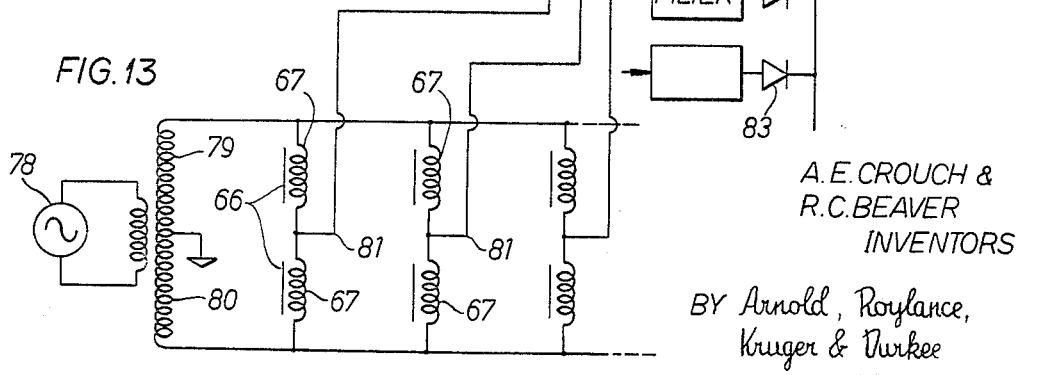

United States Patent Office 3,483,466
Patented Dec. 9, 1969

3,483,466
PIPELINE INSPECTION APPARATUS FOR DETECTION OF LONGITUDINAL DEFECTS
Alfred E. Crouch and Ruby C. Beaver, Houston, Tex., assignors to American Machine & Foundry Company, New York, N.Y.
Filed Nov. 3, 1967, Ser. No. 680,551
Int. Cl. G01r 33/12
U.S. Cl. 324—37
10 Claims

ABSTRACT OF THE DISCLOSURE

This application discloses pipeline inspection apparatus of the type propelled through a pipeline by the product being transported. The apparatus includes means for producing circumferential magnetic flux in the pipeline wall, along with flux leakage detector means scanning the interior surface of the pipewall to detect flux deflected out of the wall by longitudinally-oriented flaws, principally stress corrosion cracks in the exterior of the pipewall. Circumferential flux is produced by a pair of diametrically positioned electromagnets, the magnets being normal to one another to assure complete coverage of the pipewall, and detectors such as magnetometers or search coils are positioned on each side of the magnets to scan the entire 360° interior surface of the pipewall. If search coils are used, diagonal positioning of the coils is preferably employed.

---

Natural gas is transported from gas producing fields to major population centers throughout the country by high pressure gas transmission pipelines, many thousands of miles of these high pressure lines existing today, often in heavily populated areas. Even though originally placed in regions of low population density, the pipelines are now found in areas of high density due to urban growth. Some of the lines are now becoming quite old and so the potential hazard to human life and to property has now become significant, even through de minimus years ago when the lines were new and far removed from most population centers. To avoid the occurrence of further catastrophic failures, the pipeline ruptures which have occurred in the past have been carefully analyzed and the causes for such failures discerned. The likelihood of rupture of a pipeline which has been in service for many years can be predicted from data accumulated by inspection of the line.

It has been determined from analysis of past failures that one of the significant causes of rupture of pipelines is the occurrence of so-called stress corrosion cracks, these being cracks which form in the outside surface of the pipeline and extend longitudinally, i.e., parallel to the axis of the pipeline, and penetrate radially, perpendicular to the pipeline surface. These stress corrosion cracks occur in groups, and when several occur and grow in one longitudinal-diametric plane, the pipeline wall will be weakened to such degree that the pipe bursts under the pressure of the natural gas. The exact cause of these stress corrosion cracks is somewhat indefinite; however, it is observed that the cracks occur even in lines protected from corrosion by exterior coatings of insulating material as well as electrical cathodic protection. The stress corrosion cracks are not in the line when it is newly installed, and the cracks begin to form as minute pits and take several years to grow large enough to be a serious hazard. If the cracks are detected early before they become critical in size and number, then the defective section of a pipeline can be replaced and a potential gas pipeline failure hazard removed.

Pipeline inspection apparatus of many types has been developed in the past. For the inspection of existing lines buried in the ground, one of the more successful devices is the inspection pig which is propelled through the pipeline by the product being transported, the device scanning the pipeline wall and recording detected information for subsequent review. Many different techniques for scanning and detecting flaws in pigging apparatus of this type have been utilized. Magnetizers and flux leakage detectors, ultrasonic devices, and photoelectric techniques are some of the more successful. However, detection of small radial longitudinal cracks on the exterior of the pipeline wall is not readily accomplished by the inspection apparatus now available. Magnetic inspection apparatus of the type set forth in copending application Ser. No. 680,553, filed herewith, and assigned to the assignee of the present invention utilizes magnetic flux in an axial or longitudinal direction. Thus, such apparatus is responsive primarily to flaws or pits having a significant dimension in the circumferential direction so that magnetic flux traveling along the length of the pipeline parallel to the pipeline axis is deflected out of the wall to be detected. Longitudinal stress corrosion cracks in early stages produce little such deflection of axial flux. In like manner, ultrasonic techniques are principally useful for detecting flaws which have a significant circumferential dimension.

As set forth in the copending application Ser. No. 680,452, filed herewith by W. T. Walters, F. M. Wood, and A. E. Crouch, assigned to the assignee of this invention, stress corrosion cracks are best sensed by apparatus employing circumferential flux. In this copending application, circumferential flux is generated by high level, short duration current pulses applied to the pipewall in a longitudinal direction; however, it is sometimes preferable to avoid the use of current pulses due to the possible arcing in a volatile atmosphere, and coatings on the interior surfaces of the pipewall may prevent coupling current of high enough amperage to obtain flux levels of optimum magnitude.

It is therefore a principal feature of this invention to provide improved pipeline inspection apparatus capable of detecting small cracks in the exterior wall of the pipeline extending parallel to the axis of the line, particularly inspection apparatus adapted to be propelled through the interior of the pipeline over substantial lengths under propulsion of the product being transported. Another feature of the invention is the provision of techniques for scanning the interior wall of a pipeline to detect so-called "stress corrosion cracks." A primary feature of interest is the elimination of arcing problems as may occur if electric current is directly applied to the pipewalls for generation of magnetic flux, and the avoidance of difficulties encountered in use of current for flux generation in coated pipelines.

In accordance with an embodiment of the invention, pipeline inspection apparatus is provided in the form of a "pig" assembly including a magnetizing device which creates magnetic flux in the walls of the pipeline in a circumferential direction so that the magnetic flux will be perpendicular to the stress corrosion cracks and will thus be deflected out of the pipeline wall. Preferably two diametrically oriented electromagnets are used, these being perpendicular to one another. The inspection apparatus includes flux leakage detector devices for scanning adjacent the interior wall of the pipeline, the detector devices ordinarily being shoe assemblies bearing upon the pipeline walls adjacent the magnetizers and carrying flux detectors such as detector coils positioned to intercept flux deflected out of the pipewalls by the longitudinal cracks.

The novel features believed characteristic of this invention are set forth in the appended claims. The invention itself, however, as well as further features and advantages thereof, will best be understood by reference to the following detailed description of particular embodiments, when read in conjunction with the accompanying drawings, which form a part of this specification, wherein:

FIGURE 1 is an elevation view in section of a length of pipeline containing pipeline inspection apparatus according to one embodiment of the invention;

FIGURE 2 is a cross-sectional view of the section of pipeline of FIGURE 1, taken along the line 2—2 in FIG. 1, showing one of the magnetizers and one of the sets of detector shoes of the inspection apparatus of FIG. 1;

FIGURE 3 is a cross-sectional view of the pipeline taken along the line 3—3 in FIG. 1, showing the other of the magnetizers and detector shoe arrays of the inspection apparatus of FIG. 1;

FIGURE 4 is an elevation view in section of one of the detector shoe assemblies used in the embodiment of FIGS. 1–3;

FIGURE 5 is a bottom view of the detector shoe of FIG. 4, partly broken away;

FIGURE 6 is an elevation view in section of the detector shoe assembly of FIGS. 4 and 5, taken along the line 6—6 in FIG. 4;

FIGURE 7 is an elevation view in section of an alternative embodiment of the coupling arrangement used in the assembly of FIG. 1;

FIGURE 8a is a schematic representation of one of the scanning coils in operation;

FIGURE 8b is a graphic representation of electrical waveforms produced by the search coil of FIG. 8a;

FIGURE 9 is an elevation view in section of another embodiment of a detector shoe assembly for use in the apparatus of FIG. 1, using magnetometers rather than search coils;

FIGURE 10 is a bottom view of the detector shoe assembly of FIG. 9, partly broken away;

FIGURE 11 is an elevation view in section of the assembly of FIG. 10, taken along the line 11—11 in FIG. 10;

FIGURE 12 is a schematic representation of pole positions in operation of the embodiment of FIGS. 9–11; and FIGURE 13 is an electrical diagram in schematic form of circuitry for use with the embodiment of FIGS. 9–11.

The drawings form a part of this specification, and it may be noted that like parts bear like reference numerals when appearing in various views of the drawings.

With reference now in particular to FIG. 1 of the drawings, pipeline inspection apparatus particularly adapted for detecting longitudinal cracks in the pipeline wall is illustrated. This apparatus, of the type usually referred to as an inspection "pig," is for the purpose of scanning the pipeline walls for defects of the character described, and recording information on detected flaws for subsequent study which may result in a decision to repair or replace a section of the line. The inspection pig is self-propelled, that is, propelled by the fluid product being transported through the line, and is completely self-contained in that no external connections or trailing cables are needed. The pig must negotiate turns and discontinuities in the line, and so it is jointed in construction to permit a fairly tight turning radius. Variations in pipeline diameter, as well as obstructions such as valve seats and debris in the line, require that the outer periphery of the apparatus be somewhat flexible or yieldable, while the repeated collisions with debris, icicles of weld metal and the like require the pig to be quite ruggedly constructed. The inspection pig of FIG. 1 would be inserted into the pipeline at a pumping station using a trap of the type employed to insert scrapers, and since the distance between pumping stations is perhaps fifty miles or more, the pig must be able to traverse such distances without recharging batteries, replacing tape reels, or similar sustaining maintenance. It is for reasons of this type that the inspection pig is constructed in the manner indicated.

The pipe line inspection apparatus of FIG. 1 includes three separate sections, the first two being quite similar to one another and including both magnetizing and detecting functions, while the trailing section 13 contains the power supplies, electronic instrumentation, and recording circuitry and mechanisms. The first and second sections are coupled together by a universal joint 14, and the second and third sections are coupled together by a similar joint 15 which permits the sections to negotiate turns. The first section 11 functions also as the drive or propelling section in addition to including magnetizer and detector functions. For propulsion purposes the section 11 includes front and rear rubber cups 16 and 17, the outer peripheries of the rubber packers or cups being urged tightly against the interior circumference of the pipeline wall so that fluid pressure will be trapped downstream or on the right-hand side of these packers. This propels the driving section, and thus the entire assembly, through the pipeline from right to left along with the fluid product being transported. A nose piece 18 on the front of the driving section is dome-shaped so that if the nose of the pig drops partially into a side entry at a trap or pumping station, this nose piece will strike the edge of the pipe and deflect the pig back to the proper path. A lifting eye 19 in the front of the nose piece is for convenience in handling the pig with portable cranes or lift hoists, it being noted that the inspection pig is quite heavy, especially for large diameter pipes. Valve-controlled bypass ports may be provided to selectively permit fluid to bypass the driving cups when the speed of the pigging assembly is excessive, the valve opening or closing in response to the speed of the pig as set forth in copending application Ser. No. 680,552, filed herewith and assigned to the assignee of this invention.

The front section 11, as well as the other sections 12 and 13, may utilize a centralizer assembly including wheels 20 suspended on pivoted arms 21 for the purpose of holding the pig centered along the axis of the pipeline. The pig would tend to settle under its own weight toward the bottom of the line without some type of centering mechanism, and this would perhaps unbalance the magnetizers or detectors. The pivoted arms 21 are urged outwardly by a spring-biased drum 22 as is conventional. Usually each centralizer assembly would include three of the wheels 20 spaced at 120° positions.

The second section 12 of the pigging assembly also includes a pair of cup-like rubber packers 23 and 24, but it is noted that these rubbers are vented by a plurality of holes 25 spaced around the periphery thereof so that the fluid product may pass through, pressure being applied only against the rubber cups 16 and 17 in the front or drive sections. The rubber cups 23 and 24 thus function mainly as a resilient support for the central section. In like manner, the trailing section 13 utilizes rubber packers 26 and 27 which are vented by through holes 25 so that these packers function as supports rather than propelling means, the fluid product passing freely through the holes. The sections 12 and 13 may utilize centralizer assemblies including the wheels 20 as mentioned above. The trailing section 13 comprises principally a large sealed metal cylinder 28 containing the batteries, instrumentations and tape recorder. If necessary there may be several of the sections similar to the trailing section 13 for packaging all of the necessary power supplies, recorders and instrumentation, these additional sections being coupled behind or in front of the assembly of FIG. 1 using universal joints.

The magnetizer and detector portions of the sections 11 and 12 according to the invention will now be described. Referring to FIG. 1, it may be noted that the magneizers and arrays of detectors in the first and second sections 11 and 12 are exactly the same but are displaced by 90° with respect to one another. This arrangement provides full 360° scanning of the pipeline wall. The magnetizer in the front section 11 comprises a central iron core 30 surrounded by a winding 31 which is excited by DC supplied from the batteries in the trailing section 13. The core extends through a central cylindrical body portion 32 for the section 11, and the winding 31 may be in two parts with one on each side of the cylindrical body 32. Electrical cables for connections to the winding 31 as well as the detectors as will be described may be threaded through a central bore extending along the axis of the assembly back to the instrumentation package 28. Pole pieces for the magnetic core 30 consist of steel brushes 33 and 34 which couple the flux to the pipewall 10 where it divides and flows one-half down each side of the wall. The wire brushes accommodate variations in pipeline diameter while maintaining a maximum degree of coupling with very little leakage. Pole pieces of this type will readily pass over obstructions such as icicles of weld metal, valve seats and the like. Flux in the pipewalls will be circumferential as distinguished from axial, longitudinal or radial, and so longitudinal cracks of the type discussed above will intercept flux and cause leakage into the area adjacent the interior surface of the pipewall.

Flux leakage detection is provided in the first section 11 of the assembly of FIG. 1 by a plurality of detector shoes 35 arranged in an array of sets of five detector shoes on each side of the magnetizer, so that there would be a total of ten of the detector shoes 35 in the first section 11. Each of the detector shoes would be exactly like all the others and would contain search coils as will be described below. The detector shoes are arranged in a staggered array so that both sides of the pipewall will be completely scanned. The arrangement of the detector shoes in the first section may be best seen in the cross-sectional view of FIG. 2. Each of the detector shoes is mounted on a bracket 36 connected at its base to the central cylindrical housing 32. A pair of springs 37 connect each detector shoe 35 to the bracket 36 so that the detector shoes are resiliently but firmly urged against the surface of the pipewalls but may deflect and bounce over obstructions encountered as the pig travels through the pipeline. As seen in FIG. 2, the detectors in the first section cannot sense any defects in the regions close to the pole tips or steel brushes 33 and 34, and so another set of magnetizers and detector shoes is provided in the second section 12 arranged at right angles to the first section.

Referring now to the middle section 12 of the inspection pig of FIG. 1, and the cross-sectional view of FIG. 3, another magnetizer is provided in the form of a central core 40 along with a winding 41 which may be split in two parts with one on each side of a central cylindrical housing 42. Pole pieces for the magnetizing core 40 comprise steel brushes 43 and 44 as before, with comparison of FIGS. 2 and 3 showing that the magnetizers are displaced by 90° with respect to one another so that the center section will cover the areas not covered by the first section. The center section utilizes a set of ten detector shoes 45 which are exactly like the detector shoes 35 in the first section. The detector shoes 45 are mounted on the central body 42 by brackets 46, a pair of springs 47 connecting each detector shoe with its associated bracket as explained with reference to the first section. The detector shoes are in an array of five on each side with the two front shoes being positioned in the gaps between the three rear shoes. The ten shoes 35 along with the ten more shoes 45 together provide full 360° scanning of the pipewall.

In FIG. 4 one of the detector shoes 35 or 45 is shown in detail along with its mounting apparatus. The shoe comprises a shell of nonmagnetic but conductive material for shielding purposes which is beveled in front so that it may easily ride over obstructions. The springs 37 may be mounted on rods 50 extending through holes in the bracket 36 and pivotally mounted on the top of the shoe 35 by pivots 51. It is understood of course that other mounting arrangements could be used which permit the detector shoes to both pivot and deflect inwardly and accommodate some variation in inside diameter of the pipewall. A recess 52 in the bottom face of the detector shoe contains a plurality of search coils 53 arranged in a slanting or canted fashion as may be seen in the bottom view of FIG. 5. Each of the coils 53 may be one or several turns, with the coils arranged in the canted positions for reasons as will be explained below. The search coils 53 are protected from abrasion by a thin shim 54 composed of a nonmagnetic material such as stainless steel, but yet the shim is thin enough so that the coils will ride very close to the interior surface of the pipewall. The search coils 53 are connected by an electrical cable 55 to the recording circuitry in the trailing section, all of the cables 55 for the twenty detector shoes being preferably bunched into a large cable threaded through a central bore.

With regard to electrical cables connecting the various sections of the assembly of FIG. 1, it is noted that universal joints or pivoted connections do not readily permit threading cables through central holes therein because the cables may be abraded or severed when the joints flex. Accordingly, a coupling arrangement as seen in FIG. 7 may be utilized wherein a pair of large, oppositely wound, concentric springs 56 and 57 are connected at their opposite ends to cylindrical flanged members 58 and 59 respectively. The springs 56 and 57 are secured to the outer and inner diameters, respectively, of the members 58 and 59 in helical grooves provided for this purpose. The end courses of the springs may be welded to the members 58 and 59 for added strength. The springs are oppositely wound to retard torsional movements which are especially undesirable with respect to the sections 11 and 12 since the magnetizers and detector arrays in the sections are supposed to remain at right angles to one another. A cable 60 threaded through the coupling of FIG. 7 is secured from abrasion or severing. The member 58 would be secured to the rear end of the section 12, for example, and the flange of the member 59 secured to the forwardmost part of the section 13, this device replacing the U-joint type coupling 15 seen in FIG. 1. This coupling is described in copending application Ser. No. 680,404, filed herewith by Noel B. Proctor and assigned to the assignee of this invention.

The search coils 53 shown in FIGS. 4–6 may be loops standing on end, as illustrated, or may be narrow elongated loops positioned flat down on the shim 54. In either event, the loops are positioned at an angle to the direction of movement of the detector shoes for the reasons which will be explained with reference to FIG. 8. A search coil 53 is shown in FIG. 8a in the form of a flat loop parallel to the pipeline, the loop being actually curved to conform to the interior surface of the pipeline. Similar principles would apply for the use of a search coil 53 arranged vertically, as seen in FIGS. 4–6. It is assumed that the coil 53 in FIG. 8a is moving from right to left and encounters a longitudinal crack 61 which is of course normal to the direction of the magnetic field generated by the magnetizer. It may be assumed that the crack 61 causes pairs of north and south poles to appear adjacent the surface of the pipeline to the search coil, as indicated by the N and S notations in the figure. Even though the crack 61 may be only perhaps 0.001" in width, the effective pole spacing may be perhaps ⅛". Thus, as the search coil 53 moves into the position shown, the front conductor will cut the lines of flux of the magnetic field before the rear conductor, and in the exact position indicated in FIG. 8a there will be a net flux linkage through the coil indicated by the first N-S pair for illustrative purposes. At this point a pulse will appear at output terminals 62 for the coil, this pulse being depicted as a positive-going pulse 63 in FIG. 8b.

After the coil 53 has moved to the left to a central location along the crack 61, as indicated by dotted lines in FIG. 8a, there will be no net change in the flux linking the coil, and so there will be no output produced at the coil terminals. Then, when the coil passes over the left end of the crack 61, negative-going pulse 64 as seen in FIG. 8b will be produced.

If the coil 53 were positioned perpendicular to the direction of travel, and thus perpendicular to the longitudinal cracks to be detected, it may be noted that virtually no output would be produced by such a coil because at any position along the crack or at its ends the net flux linking the coil would be zero, and so at no point would there be a change of flux such as would produce an output pulse. If the coil 53 were positioned parallel to the direction of travel and parallel to the cracks 61, the likelihood of a coil intercepting a longitudinal crack would be very small, requiring an unduly large number of coils to completely scan the entire 360° circumference of the pipeline wall. Stacking of several of the canted or angled coils 53, as illustrated in FIG. 5, also produces more positive identification of longitudinal cracks because a given crack would intercept two or three of the coils at different time positions. It is for these reasons that the coils 53 are positioned at a substantial angle with respect to the direction of travel, perhaps 45° being preferred. When flat coils 53, as shown in FIG. 8a, as distinguished from upright coils as shown in FIGS. 4–6 are used, it is preferable to make the "gap" of the coil as indicated by the distance 65 between conductors a distance such that the effective "pole spacing" caused by a typical crack 61 will cause the first significant "south pole" encountered by the first conductor of the coil 53 in FIG. 8a to occur in time coincidence with the first significant "north pole" passing under the second or trailing conductor. This distance is of course related to the angle of the coil also. This arrangement approximately doubles the signal produced.

The search coils used to detect flux leakage in the devices thus far described are responsive only to change of flux and thus will be dependent in the amplitude of the signals produced upon the speed of travel of the inspection pig through the pipeline. For this reason and other considerations, it is sometimes preferable to utilize a magnetometer-type device rather than a search coil to detect flux leakage, the magnetometer producing an output related to the magnitude of detected flux rather than flux change.

Referring now to FIGS. 9–12 of the drawings, it may be noted that detector shoes 65 may be utilized which are similar to the detector shoes 35 discussed above but which contain a plurality of magnetometers in the form of cores 66 and coils 67 arranged in a pattern as illustrated best in FIG. 10. All of the cores 66 are mounted on a backing plate 68 formed of non-magnetic material such as brass. The shoe 65 is also non-magnetic, as is a protective shim 69 which may be stainless steel to shield the cores from abrasion. All of the coils 67 are connected to conductors in a cable 70 going to the recording circuitry. There would be a sufficient number of detector shoe 65 to scan the entire circumference in a manner similar to the detector shoes 35 discussed above, the shoes 65 being arranged in a manner similar to the shoes 35 and 45 of FIGS. 1–3.

Referring to FIG. 12, it may be noted that the magnetometer devices are principally responsive to longitudinal cracks which pass between adjacent pairs of the cores 66 in the same column, and so the cores are arranged in a staggered relationship. In FIG. 12, a crack 71 would produce a maximum output from a pair 72 of the cores 66, but would produce little output from a core 73 under which it would also pass. A shunting effect would be produced by the core 73 itself. In like manner, a crack 74 would produce little output from a core 75, but would produce maximum output from a pair of cores 76 between which it passes.

With reference now to FIG. 13, circuitry for use with the magnetometer coils 67 is illustrated in schematic form. The coils 67 for the core 66 are paired and connected in bridge arrangements for excitation by an AC source 78 which drives a transformer having a center tapped secondary which forms two arms 79 and 80 of the bridge. A pair of the coils 67, such as the pair 72 or the pair 76 of FIG. 12 would form the other two arms of a bridge, and an output 81 would exhibit signals only upon unbalance of the bridge. The oscillator 78 would ordinarily be of a frequency of 400 cycles or more. Each of the coils 67 is paired with an adjacent coil to form arms of a bridge along with the transformer secondary, producing another output 81. All of the outputs are applied to band pass filters 82 tuned to perhaps a third harmonic of the frequency of the oscillator 78 to remove signals caused by steady state unbalance of the bridge arrangements or overall fluctuations in magnetic field or spacing between the detectors and the pipeline walls, etc. The outputs from all of the filters 82 are applied to an OR gate arrangement including diodes 83 so that an output is produced when any one of the bridge arrangements detects an unbalance as may be caused by a flaw. The OR gate output is amplified and applied to a recorder 84, this being ordinarily a multi-channel magnetic tape recorder. All of the electronic circuitry of FIG. 13, with the exception of the magnetometer coil 67, would usually be located in the instrumentation cylinder 28 in the trailing section 13 of the pig.

In operation of the circuitry of FIG. 13 along with the magnetometer arrangement of FIGS. 9–12, it may be noted that the magnetizer units including cores 30 and 40 and coils 31 and 41 will produce magnetic flux in the pipewall in a circumferential direction at substantially a saturation level. Longitudinal flaws will cause flux leakage into the area scanned by the detector shoes 65. The cores 66 will be alternately driven to saturation in both directions by the 400 cycle AC applied from the source 78, the material of the core 66 being of a type having a substantially square hysteresis loop. The presence of a magnetic field adjacent a crack caused by flux leakage will bias the cores 66 slightly in one direction or another, and so adjacent pairs of the cores in a bridge circuit will reach saturation in each half cycle of the AC excitation at slightly different instants. For example, the pair 72 of the core 66 of FIG. 12 will be biased slightly in opposite directions by magnetic flux deflected by the crack 71, one of the pair being adjacent a north pole and the other adjacent a sound pole. This will result in unbalance of the bridge arrangement including the coils for the pair 72 at a brief instant at the beginning of each half cycle, resulting in spikes of output voltage at the output 81. It is this effect which provides the signals being detected and recorded in the system of FIG. 13.

As an alternative to the search coils or magnetometers discussed above as flux leakage detectors, a magnetic core structure using a Hall effect element of the type disclosed in copending application Ser. No. 680,572, filed herewith and assigned to the assignee of this invention may be utilized. Accordingly, while preferred types of flux leakage detectors have been described, other types may be suitable according to the principles of the invention.

What is claimed is:

1. Apparatus for inspecting for longitudinal cracks throughout 360° of a tubular member capable of conducting magnetic flux, said apparatus comprising:
   means for producing unidirectional magnetic flux that flows in a circumferential path in the tubular member,
   a plurality of flux leakage detector means adapted to be disposed closely adjacent and completely around a wall of said tubular member to provide 360° flux leakage searching around the tubular member,
   said flux producing means and said flux leakage detector means being fixed relative to each other and being adapted to have a relative motion that is substantially only longitudinal with respect to the central axis of said tubular member,
   said flux leakage detector means comprising coils of generally elongated rectangular shape disposed with their direction of elongation at an oblique angle to the direction of magnetic flux flow in said circumferential path.

2. The combination claimed in claim 1 wherein said oblique angle is approximately equal to 45°.

3. The combination claimed in claim 1 wherein each of said plurality of flux leakage detector means are coils that lie in respective planes that are at an oblique angle of approximately 45° to the axis of said tubular member.

4. Pipeline inspection apparatus for inspecting 360° of a pipe wall to detect pipe wall cracks or the like which extend generally longitudinally with respect to the axis of the pipe, said apparatus comprising the combination
   means for causing said apparatus to be propelled through the pipeline with substantially only an axial movement through a given section of pipe,
   means adapted to be disposed within the pipe to be inspected for producing unidirectional magnetic flux that flows in a circumferential path in the wall of the pipe,
   said magnetic flux producing means being substantially fixed against rotary motion relative to the remainder of said apparatus whereby the movement of the flux producing means through a given section of pipe is substantially only longitudinal,
   flux leakage detector means adapted to be disposed closely adjacent and completely around the inner wall of said pipe to detect magnetic flux deflected out of the pipe wall by a longitudinally extending crack,
   said flux leakage detector means being substantially fixed against rotary motion relative to the remainder of said apparatus and thus substantially circumferentially fixed relative to a circumferential flux path established in the wall of a given section of the pipe as the apparatus passes through that given section of pipe,
   said flux leakage detector means including a plurality of coils disposed about the inner surface of the section of pipe when the apparatus is within the pipe to provide uninterrupted flux leakage detection capability completely around said inner surface as the apparatus is propelled through the pipe,
   said coils being generally of elongated rectangular shape and when the apparatus is within a pipe the coils are positioned with their direction of elongation at an oblique angle to the direction of magnetic flux flow in said circumferential path.

5. The combination claimed in claim 4 wherein said oblique angle is approximately equal to 45°.

6. The combination claimed in claim 4 wherein each one of said plurality of coils lies in a plane that is at an oblique angle approximately equal to 45° to the axial direction of travel of the apparatus through a pipe.

7. The combination claimed in claim 4 wherein said plurality of coils is divided into groups and each group is disposed within a respective detector shoe that is adapted to move with substantially only longitudinal translation along the inner surface of said pipe.

8. Pipeline inspection apparatus for detecting pipe wall cracks or the like that extend generally longitudinally with respect to the axis of the pipe, and adapted to be propelled through the interior of the pipeline by the product being transported therethrough, said apparatus comprising:
   an axially disposed body portion extending longitudinally within said pipe,
   means for causing said body portion to be translated through a section of the pipe with substantially only an axial movement by the product being transported therethrough,
   first and second D.C. electromagnet means fixed to said body portion in non-rotating relationship therewith and in axially spaced relationship to each other,
   each of said electromagnet means including a respective core member that extends diametrically across the interior of the pipe, said core members being angularly disposed with respect to each other about the axis of said pipe,
   a plurality of magnetic pole pieces each comprised of a wire brush and each respectively positioned on an end of a core member and adapted to make a sliding contact with the interior surface of the pipe as the body portion moves through the pipe, whereby each electromagnet means establishes a magnetic flux field that passes through the pipe wall in a circumferential path, the magnetic flux flowing between respective pole pieces of an electromagnet means in two semi-circular portions of its respective path,
   first and second groups of detector shoes secured to said body portion in non-rotating relationship therewith and disposed to contact the inner surface of the pipe as the inspection apparatus is propelled therethrough,
   the two groups of detector shoes being respectively angularly disposed with respect to the two electromagnet means and the shoes of each group being positioned to scan with substantially only a longitudinal movement a portion of the circumferential flux path established by its respective electromagnet, the shoes of the two groups being circumferentially disposed to provide 360° uninterrupted coverage of the inner surface of the pipe,
   flux leakage detector means located in said shoes and positioned to be closely adjacent the inner surface of the pipe as the apparatus is propelled through the pipe.

9. The combination claimed in claim 8 wherein said flux leakage detector means includes at least one search coil disposed within a detector shoe, said coil being inclined at an oblique angle to the direction of travel of said apparatus through a pipeline.

10. The combination claimed in claim 8 wherein said flux leakage detector means includes at least one pair of magnetometer coils disposed in each of the detector shoes.

References Cited

UNITED STATES PATENTS

| | | | |
|---|---|---|---|
| 1,966,984 | 7/1934 | Lichtenberger et al. | 324—37 |
| 2,124,579 | 7/1938 | Knerr et al. | 324—37 X |
| 2,684,464 | 7/1954 | Hastings et al. | 324—37 |
| 2,770,773 | 11/1956 | Cooley | 324—37 |
| 3,015,063 | 12/1961 | Ownby | 324—37 |
| 3,243,697 | 3/1966 | Schmidt | 324—37 |
| 1,896,737 | 2/1933 | Zuschlag | 324—37 |

FOREIGN PATENTS 1,147,822   6/1957   France.

OTHER REFERENCES

McGonnagle: Non Destructive Testing, McGraw-Hill; 1961, pp. 308–309.

RUDOLPH V. ROLINEC, Primary Examiner

A. E. SMITH, Assistant Examiner

U.S. Cl. X.R.

324—40